Patented Feb. 20, 1951

2,542,107

UNITED STATES PATENT OFFICE 2,542,107

METHOD OF CHLORINATING HYDROCARBONS

George W. Ayers, Chicago, Ill., and Erskine E. Harton, Jr., Alexandria, Va., assignors to The Pure Oil Company, Chicago, Ill., a corporation of Ohio No Drawing. Application September 24, 1945, Serial No. 618,422

12 Claims. (Cl. 260—659)

This invention relates to a method of chlorinating saturated hydrocarbons containing a tertiary carbon atom and more particularly to a method for separating saturated hydrocarbons which do not contain a tertiary carbon atom from other hydrocarbons. This application is a continuation-in-part of application Serial No. 474,748, now Patent No. 2,418,814, dated April 15, 1947.

An object of the invention is to selectively chlorinate saturated hydrocarbons containing a tertiary carbon atom in a mixture containing saturated hydrocarbons which do not contain a tertiary carbon atom.

Another object of our invention is to obtain saturated hydrocarbons not containing tertiary carbon atoms from an admixture containing saturated hydrocarbons of substantially the same boiling point containing tertiary carbon atoms.

Still another object of the invention is to provide a method for chlorinating hydrocarbons containing a tertiary carbon atom at or about atmospheric temperature.

A still further object of the invention is to provide catalysts which accelerate the rate of chlorination of saturated hydrocarbons containing tertiary carbon atoms.

Other objects of the invention will become apparent from the following description.

We have discovered that the chlorination of saturated hydrocarbons containing a tertiary carbon atom can be accelerated by conducting the chlorination in the presence of chlorides of the rare earth metals, i. e. the metals having atomic numbers from 58 to 71 inclusive, zinc chloride, phosphorus pentachloride and nitrosyl chloride. We have further discovered that if the temperature is properly controlled the aforesaid compounds will catalyze the chlorination of hydrocarbons containing a tertiary carbon atom without materially affecting the rate of chlorination of saturated hydrocarbons not containing a tertiary carbon atom, thereby permitting separation of the two types of hydrocarbons.

In accordance with our invention a mixture of hydrocarbons containing open chain paraffins and/or cycloparaffins not containing a tertiary carbon atom, such as normal heptane and cyclohexane, and also containing isoparaffins and/or alkylated cycloparaffins containing a tertiary carbon atom such as iso-octane and methylcyclohexane, is preferably dissolved in a solvent which is substantially inert to the chlorinating agent. Although the use of a solvent is not necessary, it is preferred. Where a solvent is not used very high mol ratios of hydrocarbon to chlorinating agent must be used to obtain good selectivity of chlorination. The ratio of hydrocarbon plus solvent to chlorinating agent should be at least 8 to 1 in order to get good selectivity of chlorination and also to avoid explosive mixtures. As solvents may be used nitrobenzene and organic chlorine containing compounds such as chloroform, carbon tetrachloride, acetylene tetrachloride, hexachlorethane, and others. For best results the volume of solvent used should be at least equal in volume to the hydrocarbon mixture. The volume of solvent to hydrocarbon may be maintained as high as 10 to 1, or more.

As chlorinating agents for use in carrying out our process any mild chlorinating agent may be used, such as antimony pentachloride, sulfuryl chloride, or even chlorine gas when used in such manner that its concentration in the reaction mixtures is sufficiently low. The chlorinating agent may be added to the hydrocarbon mixture to be chlorinated either continuously or batchwise, care being taken to maintain mol ratio of hydrocarbon plus solvent to chlorinating agent in the mixture above 8 to 1.

Although the temperature at which chlorination is effected may range from approximately 70° to 150° F., we prefer to maintain the temperature at approximately 70° to 90° F., since the selective action of the chlorinating agent is most pronounced within this temperature range.

The reaction mixture should be kept dry since the presence of moisture deleteriously affects the activity of the catalyst. As drying agents phosphorus pentoxide, sodium sulfate, and others, may be used. A very small quantity of drying agent is sufficient, as for example 0.5 pound, or less, per 100 pounds of solution to be chlorinated. Care should be exercised not to use alumina as drying agent in the presence of a chlorinating agent, since aluminum chloride forms and aluminum chloride is a non-selective chlorinating catalyst.

The time required for chlorination of substantially all the isoparaffins, or other saturated hydrocarbons containing a tertiary carbon atom will vary from approximately 4 to 20 hours, at a temperature of 70° to 90° F. when using dilute solutions of the hydrocarbons and high mol ratios of hydrocarbon to chlorinating agent. Longer periods of contact result in partial chlorination of the non-tertiary carbon atom hydrocarbons. Increasing the temperature decreases the time required for chlorination, but also results in less selective chlorination. Likewise, the higher the ratio of the chlorinating agent to hydrocarbon present, the less the selectivity. The mixture to be chlorinated may be preliminarily treated to remove aromatic and unsaturated hydrocarbons. This may be done either by treatment with 100% sulfuric acid at room temperature; or by treatment with 100% sulfuric acid at temperatures of 32° to 40° F. followed by three successive treatments with 95% to 98% of sulfuric acid at approximately the same temperature using one to two parts of acid to one part of hydrocarbon mixture; or the aromatic, olefin and other unsaturated hydrocarbons may be removed by a preliminary chlorination step at approximately normal atmospheric temperature in the absence of the catalyst. These hydrocarbons are readily chlorinated before chlorination of the saturated hydrocarbons takes place. In the event that it is not required to obtain substantially pure chlorinated hydrocarbons it is not necessary to remove the aromatic and other unsaturated hydrocarbons as a preliminary step, since these hydrocarbons will be chlorinated together with the isoparaffins and alkylated cycloparaffins.

Where the process is carried out for the purpose of separating iso-hydrocarbons, that is saturated hydrocarbons containing a tertiary carbon atom, from other saturated hydrocarbons, the mixture treated should be a narrow-boiling fraction, preferably a fraction having a boiling range not exceeding 50° to 75° F., in order that the non-chlorinated hydrocarbons may be separated from the chlorinated hydrocarbons by distillation.

The process should be carried out in apparatus constructed of materials which are immune to attack by chlorine. Steel, aluminum and carbon surfaces should be avoided since ferric chloride, aluminum chloride, charcoal, and other forms of carbon are non-selective chlorination catalysts. Apparatus lined with glass or ceramic material is suitable.

In order to demonstrate the effect of various halides in catalyzing the chlorination of saturated hydrocarbons containing a tertiary carbon atom, and saturated hydrocarbons not containing a tertiary carbon atom, a number of tests were made on normal heptane and iso-octane. The tests were all carried out at temperatures of 70° to 80° F. and the chlorinating agent used was antimony pentachloride. A mixture of the hydrocarbon to be tested in the amount of 10 mols to one mol of catalyst, 6 mols of phosphorus pentoxide, 50 mols of antimony pentachloride and 1180 mols of chloroform was used in each test, except those tests marked with an asterisk in which the ratio of reaction was 2 mols of hydrocarbon, one mol of catalyst, 6 mols of phosphorus pentoxide, 48 mols of antimony pentachloride and 600 mols of chloroform. The mixtures were allowed to stand for 18 hours and then analyzed to determine the amount of chlorine that reacted. The figures given in the table represent the number of atoms of hydrogen replaced by chlorine per molecule of hydrocarbon:

Table

| Compound | Normal Heptane | | Iso-Octane | |
|---|---|---|---|---|
| | With $P_2O_5$ | Without $P_2O_5$ | With $P_2O_5$ | Without $P_2O_5$ |
| Phosphorus Pentachloride | 0.1 | 0.1 | 2.7 | 0.3 |
| Mixtures of rare earth Chlorides (1) | 0.1 | 0.1 | | 2.4 |
| Zinc Chloride (dried) | 0.3 | 0.1 | 3.6 | 0.3 |
| Ferric Chloride (anhydrous) | 0.8 | 0.04 | 2.0 | 0.08 |
| Mercuric Chloride | 0.4 | 0.05 | 1.9 | 0.08 |
| Cuprous Chloride | 1.0 | 0.4 | 2.1 | 0.5 |
| Tin Tetrachloride | 0.09 | | 0.1 | |
| Manganous Chloride* (dried) | 0.05 | | 0.1 | |
| Lead Chloride* | 0.05 | | 0.1 | |
| None* | 0.01 | | 0.02 | |

1 This is a product sold by Lindsey Light and Chemical Company consisting of a mixture of all the rare earth elements, except cerium.

The mixture of rare earth chlorides was made by dissolving the product obtained from Lindsey Light and Chemical Company in concentrated hydrochloric acid.

It is apparent from the table that the rare earth chlorides, phosphorus pentachloride and zinc chloride do not materially accelerate the chlorination of normal heptane under the reaction conditions, but that these chlorides greatly accelerate the rate of chlorination of iso-octane when the chlorination is conducted in the presence of phosphorus pentoxide. The phosphorus pentoxide acts as a drying agent to keep the reaction mixture substantially free of moisture. The rare earth chlorides are effective in the presence of moisture, as well as in the absence thereof.

On the other hand, ferric, cuprous and mercuric chlorides are not sufficiently selective as chlorinating catalysts to be of practical value in effecting a separation of tertiary carbon atom hydrocarbons from non-tertiary carbon atom hydrocarbons. In addition to not being selective in their action, tin tetrachloride, manganous chloride and lead chloride have very little catalytic effect in accelerating chlorination of tertiary carbon atom hydrocarbons.

The amount of catalyst used is not critical and may vary over wide limits.

It will be seen, therefore, that by using certain chlorides as catalysts under controlled reaction conditions hydrocarbons containing tertiary carbon atoms can be selectively chlorinated in the presence of saturated hydrocarbons which do not contain a tertiary carbon atom, and in this manner the two types of hydrocarbons can be separated from each other.

It is claimed:

1. The method of chlorinating saturated hydrocarbons containing a tertiary carbon atom without substantially chlorinating saturated hydrocarbons not containing a tertiary carbon atom consisting in reacting a mixture of said hydrocarbons at a temperature of approximately 70° to 150° F. with a chlorinating agent in the presence of a catalyst selected from the group consisting of phosphorus pentachloride, zinc chloride and chlorides of the rare earth elements in the presence of a drying agent for a period of time sufficient to chlorinate substantially all the tertiary carbon-containing hydrocarbons but insufficient to chlorinate any substantial part of the non-tertiary carbon-containing hydrocarbons, the mol ratio of hydrocarbons to chlorinating agent in the reaction mixture being maintained at a ratio greater than 8 to 1.

2. Method in accordance with claim 1 in which the catalyst is phosphorus pentachloride.

3. Method in accordance with claim 1 in which the catalyst is zinc chloride.

4. Method in accordance with claim 1 in which the catalyst is a mixture of chlorides of rare earth elements.

5. The method of selectively chlorinating saturated tertiary carbon-containing hydrocarbons in a mixture containing saturated non-tertiary carbon-containing hydrocarbons consisting in reacting said mixture with antimony pentachloride at temperatures of approximately 70° to 90° F. in the presence of a catalyst selected from the group consisting of phosphorus pentachloride, zinc chloride and chlorides of the rare earth elements, while maintaining the reaction mixture substantially free of moisture, for a period of time sufficient to chlorinate substantially all the saturated tertiary carbon-containing hydrocarbons but insufficient to chlorinate any substantial amount of non-tertiary carbon-containing hydrocarbons, and maintaining the mol ratio of hydrocarbons to chlorinating agent greater than 8 to 1 during the reaction.

6. Method in accordance with claim 5 in which the catalyst is phosphorus pentachloride.

7. Method in accordance with claim 5 in which the catalyst is zinc chloride.

8. Method in accordance with claim 5 in which the catalyst is a mixture of chlorides of rare earth elements.

9. The method of selectively chlorinating saturated tertiary carbon-containing hydrocarbons in a mixture containing non-tertiary carbon-containing hydrocarbons consisting in reacting said hydrocarbons with antimony pentachloride at temperatures of approximately 70° to 90° F. in the presence of a solvent for said hydrocarbons which is substantially inert to chlorination under reaction conditions, sufficient phosphorus pentoxide to keep the reaction mixture substantially moisture free, and a catalyst selected from the group consisting of phosphorus pentachloride, zinc chloride and chlorides of the rare earth elements, the mol ratio hydrocarbons plus solvent to antimony pentachloride in the reaction mixture being maintained greater than 8 to 1 and the reactants being allowed to remain in contact with each other for a period of time to chlorinate substantially all the saturated tertiary carbon-containing hydrocarbons but insufficient to chlorinate any substantial quantity of non-tertiary carbon-containing hydrocarbons.

10. Method in accordance with claim 9 in which the catalyst is phosphorus pentachloride.

11. Method in accordance with claim 9 in which the catalyst is zinc chloride.

12. Method in accordance with claim 9 in which the catalyst is a mixture of chlorides of rare earth elements.

GEORGE W. AYERS.
ERSKINE E. HARTON, Jr.

REFERENCES CITED

The following references are of record in the file of this patent:

UNITED STATES PATENTS

| Number | Name | Date |
|---|---|---|
| 1,677,831 | Krause | July 17, 1928 |
| 2,418,814 | Ayers et al. | Aug. 15, 1947 |

OTHER REFERENCES

Egloff et al.: "Isomerization of Pure Hydrocarbons," pages 407–419 (1942).